Aug. 26, 1958  J. J. MISKEL ET AL  2,848,997
SQUEEZE BOTTLE
Filed June 11, 1956

INVENTORS
JOHN J. MISKEL,
HUGH HORNER &
JEREMIAH A. LOTT
BY Connolly and Hutz
ATTORNEYS

United States Patent Office 2,848,997
Patented Aug. 26, 1958

2,848,997

SQUEEZE BOTTLE

John J. Miskel, Brooklyn, and Hugh Horner, Merrick, N. Y., and Jeremiah A. Lott, Fanwood, N. J., assignors to Chas. Pfizer & Co., Inc., Brooklyn, N. Y., a corporation of Delaware Application June 11, 1956, Serial No. 590,659

4 Claims. (Cl. 128—232)

This invention relates to a squeeze bottle for withdrawal and discharge of a liquid, and more particularly to a squeeze bottle of the aforementioned type which is adapted for withdrawing a liquid, mixing it with medication and discharging the mixture.

A novel method has been proposed for the treatment of bovine mastitis. To carry out this method, a dry mixture of antibiotics is packaged in a novel squeeze bottle including a cannula. In accordance with this novel method, milk is withdrawn from an infected cow and mixed with the contents of the container. The mixture is then injected back into the animal. This novel method and novel compositions for the dry antibiotic mixture are fully described in commonly assigned copending application Serial No. 583,686, filed May 9, 1956. To effectively carry out this novel method, a container should fulfill a number of critical requirements which are enumerated in the following.

For self-evident reasons the dry powder and cannula must be protected from contamination before administration. For prompt suspension of the antibiotics, the container must permit initial withdrawal of as much milk as possible. This permits a maximum number of particles of antibiotics to be contacted on the first application of milk to the dry powder. Easy withdrawal and discharge of the contents should be facilitated during the passage of the contents several times back and forth between the container and the infected animal. After suspension of the particles within the milk has been completed, the container structure should permit substantially complete expulsion of its contents into the animal. The structure should accordingly be substantially fully collapsible to facilitate its complete discharge, but the cannula and exit portion of the bottle must be maintained free of obstruction at all times to facilitate successive rapid withdrawals and discharges. The structure should concurrently be simple and economical to manufacture and fabricate, particularly because it is discarded after a single use.

A novel squeeze bottle unusually well adapted for carrying out the aforementioned novel method is unexpectedly provided in accordance with this invention. Its structure includes a container of a thin resilient plastic closed by a cap including closure and cannula portions. The neck of the container and the closure portion of the cap respectively include external and internal protuberances for locking the cap securely upon the container. The container includes an indentation in its base for promoting and facilitating substantially complete collapse of the container when it is squeezed.

The cap also includes a centrally disposed boss which serves a dual purpose. It guides the positioning of the cap upon the container and fits closely within the neck to support it and to maintain the cap firmly interlocked with the neck throughout all phases of operation. Even during the substantially completely collapsed condition of the container, the boss maintains the cap securely interlocked with the neck of the container and maintains an unobstructed flow passage to and from the container to prevent stoppage of flow during successive discharges and withdrawals.

A removable sleeve having a closed end is applied over the cannula to protect the cannula and contents of the container from contamination. This sleeve may have a protuberance extending internally from its closed end, for plugging the upper end of the cannula, and ring-shaped protuberances or locking rings circumferentially disposed along the interior of the sleeve. This plugging protuberance and the locking rings cooperate with the cannula to provide a secure and effective seal and protector for the portions of the structure which contact the animal, which may be quickly and conveniently removed before administration.

Novel features and advantages of the present invention will become apparent to one skilled in the art from a reading of the following description in conjunction with the accompanying drawings in which.

Figure 1:
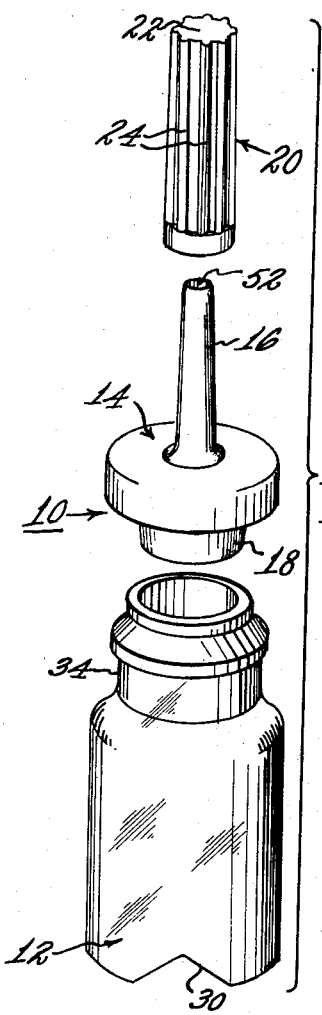
Fig. 1 is an exploded perspective view of the various parts of an embodiment of this invention.
Figure 2:
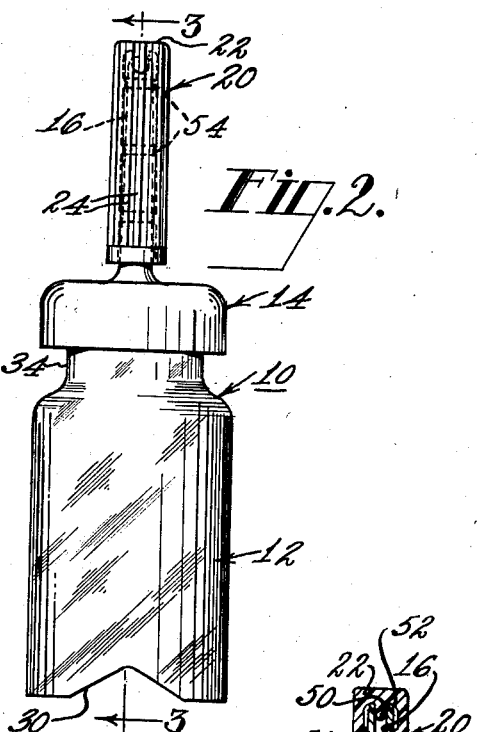
Fig. 2 is a view in elevation of the assembled embodiment shown in Fig. 1.

Fig. 1 shows the three major portions of an embodiment 10 of this invention in exploded form to clearly indicate these parts and their mode of assembly to provide the squeeze bottle shown in assembled form in Fig. 2. The squeeze bottle 10 includes a container 12 of thin resilient plastic, polyethylene, for example, of an average wall thickness of approximately from 0.025" to 0.035". The container 12 is closed by a cap 14 which may also be made, for example of polyethylene plastic of a greater wall thickness relative to the thickness of the container wall which provides the amount of structural rigidity necessary to perform its functions as indicated herein.

The cap 14 includes a cannula 16 and a centrally disposed boss 18 later described in detail. A sleeve 20 having a closed end 22 is provided for application over the cannula to seal and protect the cannula and contents of the container from contamination during storage and handling prior to its use. Cap 14 includes a number of external longitudinal ribs 24 to provide a means for grasping the sleeve and for stiffening it without adding excessive material. Details of this structure are described in conjunction with the description of the remaining figures of the drawing which are described in detail in the following, in conjunction with the manner in which the features of this structure cooperate to provide its unexpectedly efficient operating characteristics.

Referring to Figs. 2 through 5, an indentation 30 is shown at the base of the container 12. This indentation, for example, is V-shaped extending completely across the base of the container to facilitate its substantially complete collapse when the bottle is squeezed.

As previously mentioned, the cap 14 includes a tapering cannula 16 and a centrally disposed boss 18. The hollow tubular cannula or elongated tip is provided for insertion into the infected quarter of the animal to be treated. Cannula 16 is slightly tapered to facilitate insertion and withdrawal, and its tubular construction provides a structure sufficiently rigid to maintain an unobstructed flow passage throughout all phases of operation. This rigidity is enhanced by the manner in which the cannula 16 is smoothly flared into the boss portion 18 of the cap 14.

The boss 18 may be described as a collar depending concentrically within the outer closure portion or skirt 32 of the cap 14. The end of boss 18, remote from the cap 14, is tapered to facilitate insertion of the boss within the neck 34 of container 12. This facilitates placement of cap 14 upon the container 12 which facility is advantageous, particularly when these bottles are assembled by automatic machinery.

The neck 34 of container 12 and skirt or closure portion 32 of the cap 14 respectively, include an external protuberance 36 and an internal protuberance 38 for locking the cap 14 securely upon the container 12. These protuberances, for example, extend about the complete circumference of the outside of the neck 34 and the inside of the closure portion 32. Adequate locking, however, may be provided with partially circumferential protuberances.

The root portions 40 of boss 18 have an external diameter which fits smoothly within the diameter of the mouth 42 of the neck 34 of container 12. As the boss 18 is fully inserted within the mouth 42 of the container 12, the neck 34 is firmly supported to securely maintain the neck protuberance 36 locked within the internal protuberance 38 on the closure portion 32 of cap 14. The root portion 40 may have a diameter slightly in excess of that of the internal diameter of the mouth 42 in order to slightly expand the protuberance 36 in the locking position. Protuberance 36 has a leading surface 44 inclined in a direction to facilitate insertion of the neck within the closure 32 and a rear surface 46 positioned at an angle to lock in back of the cooperating interlocking protuberance 38. The boss, therefore, provides the dual function of guiding application of the cap upon the container and then securely interlocking the cap after application.

Sleeve 20 has a closed end 22 for sealing the contents of the container. An internal protuberance 50 extends from the closed end 22 towards the open end of sleeve 20 to provide a means for plugging the open end 52 of the cannula 16. A series of internal ring-shaped protuberances 54 are internally disposed at longitudinal sections along the length of sleeve 20. These ring-shaped protuberances have an unstressed internal clearance diameter slightly smaller than the outer surfaces of the corresponding portions of cannula 16 to cause rings 54 and associated sleeve 20 to firmly grasp the outer surface of the cannula. Plug 50 has a rounded entrance portion to facilitate and guide its insertion into the open end 52 of cannula 16.

Sleeve 20, therefore, firmly grasps and seals cannula 16 to preserve the contents of the container and the portions of the container or squeeze bottle which contact the animal free from contamination during periods of storage and handling prior to use.

In using squeeze bottle 10 to administer the novel compositions in accordance with the novel method described in the aforementioned copending application, the bottle is first collapsed by squeezing to exhaust as much air as possible. While in this condition, the cannula 16 is inserted into the infected quarter of the cow to be treated. Milk is then withdrawn into the container by gradually releasing the hand pressure on the container while the animal is simultaneously milked with the other hand. The milk is then passed several times back and forth between the container and the infected quarter until all of the antibiotic composition in the container has been suspended. At this time, the suspension is completely expelled into the infected quarter and the cannula is withdrawn.

Figure 3:
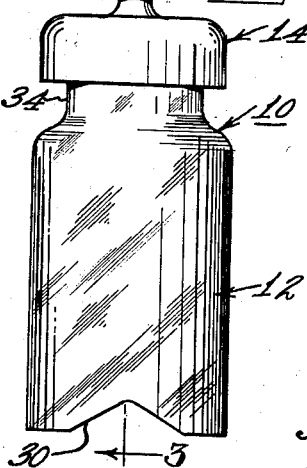
Fig. 3 is a cross-sectional view in elevation taken through Fig. 2 along the line 3—3 and looking in the direction of the arrows.
Figure 4:
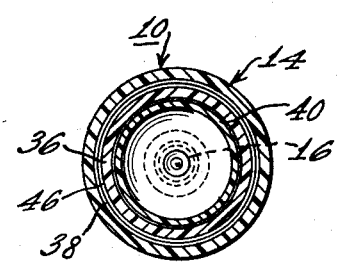
Fig. 4 is a plan view in cross-section taken through Fig. 3 along the line 4—4 and looking in the direction of the arrows.
Figure 5:
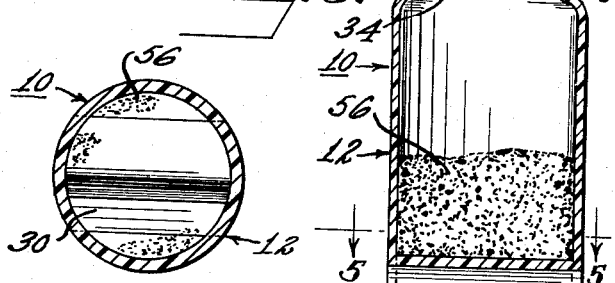
Fig. 5 is a plan view in cross section taken through Fig. 3 along the line 5—5 and looking in the direction of the arrows.

This novel squeeze bottle provides a means for rapidly transporting the antibiotic to the site of the injection. Its unusually fully collapsible structure enables initial withdrawal of a large quantity of milk from the infected quarter so that a maximum number of particles of medication will be contacted on the first application of the milk to the dry product. To facilitate this prompt and efficient suspension, it is preferred that a container of approximately 15-20 cc. capacity be employed and that it be filled with medication to about 25-50% of its volume. The medication accordingly should constitute a volume of approximately 4 to 10 cc. A medication in the form of a dry product is shown in Fig. 3 designated by reference character 56.

As previously mentioned, the boss 18 maintains the flow passage to and from the container unobstructed throughout all phases of operation including the severely collapsed phase. Concurrently, boss 18 also supports neck 34 of the container 12 which insures secure retention of the cap 14 upon the container even in its severely collapsed condition.

What is claimed is:

1. A squeeze bottle comprising a container of thin resilient plastic, a cap including closure and cannula portions, the neck of said container and said closure portions respectively including external and internal protuberances for locking said cap upon said container, said cap including a centrally disposed boss for insertion within said neck, said boss fitting closely within said neck to support said neck and to maintain said cap firmly locked therewith throughout all phases of operation, removable means applied over said cannula to protect said cannula and the contents of said container from contamination, and said container includes an indentation extending across its base for promoting substantially complete collapse of said container upon application of pressure thereto.

2. A squeeze bottle comprising a container of thin resilient plastic, a cap including closure and cannula portions, the neck of said container and said closure portions respectively including external and internal protuberances for locking said cap upon said container, said cap including a centrally disposed boss for insertion within said neck, said boss fitting closely within said neck to support said neck and to maintain said cap firmly locked therewith throughout all phases of operation, removable means applied over said cannula to protect said cannula and the contents of said container from contamination, and said container is comprised of polyethylene plastic having an average wall thickness from 0.025" to 0.035".

3. A squeeze bottle comprising a container of thin resilient plastic, a cap including closure and cannula portions, the neck of said container and said closure portions respectively including external and internal protuberances for locking said cap upon said container, said cap including a centrally disposed boss for insertion within said neck, said boss fitting closely within said neck to support said neck and to maintain said cap firmly locked therewith throughout all phases of operation, removable means applied over said cannula to protect said cannula and the contents of said container from contamination, and the portion of said boss remote from said cap is of reduced cross section to facilitate insertion of said boss within said neck.

4. A squeeze bottle as set forth in claim 3 wherein the diameter at the root of said boss fits snugly within said neck at a point corresponding to said external protuberance of said neck so that said external protuberance is forced outwardly to securely lock said external protuberance within said internal protuberance of said cap.

References Cited in the file of this patent

UNITED STATES PATENTS

| | | |
|---|---|---|
| 1,488,777 | Clements | Apr. 1, 1924 |
| 2,365,524 | Court | Dec. 19, 1944 |
| 2,514,576 | Hein et al. | July 11, 1950 |
| 2,683,456 | Pierson | July 13, 1954 |